(12) United States Patent
Zaccarin et al.

(10) Patent No.: US 6,865,653 B2
(45) Date of Patent: Mar. 8, 2005

(54) SYSTEM AND METHOD FOR DYNAMIC POWER MANAGEMENT USING DATA BUFFER LEVELS

(75) Inventors: André Zaccarin, Quebec (CA); Trevor Pering, Mountain View, CA (US); Marco Y. Wirasinghe, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 230 days.

(21) Appl. No.: 10/024,904

(22) Filed: Dec. 18, 2001

(65) Prior Publication Data

US 2003/0115428 A1 Jun. 19, 2003

(51) Int. Cl.[7] .................................................. G06F 1/26
(52) U.S. Cl. ...................... 711/154; 711/156; 713/300; 713/322; 713/360; 710/56; 710/57; 365/226
(58) Field of Search ................................. 711/156, 154; 365/226; 713/300, 310–340; 710/56, 57

(56) References Cited

U.S. PATENT DOCUMENTS

| | | | |
|---|---|---|---|
| 6,205,078 B1 | * | 3/2001 | Merritt ........................ 365/226 |
| 6,510,099 B1 | * | 1/2003 | Wilcox et al. .......... 365/230.06 |
| 2001/0043353 A1 | * | 11/2001 | Iizuka et al. ................ 358/1.14 |
| 2002/0169990 A1 | * | 11/2002 | Sherburne ................... 713/300 |

* cited by examiner

*Primary Examiner*—Mano Padmanabhan
*Assistant Examiner*—Jasmine Song
(74) *Attorney, Agent, or Firm*—Crystal D. Sales

(57) ABSTRACT

A power management system for digital circuitry uses data buffer monitoring to determine appropriate processor clock speed or voltage. This allows a processor to be switched from a low power state to a high power state when a monitored data buffer level feeding data to a power intensive application is greater than a second memory buffer level. The processor is switched from a high power state to a low power state when the monitored data buffer level is less than a first memory buffer level.

24 Claims, 6 Drawing Sheets

SYSTEM AND METHOD FOR DYNAMIC POWER MANAGEMENT USING DATA BUFFER LEVELS

FIELD OF THE INVENTION

The present invention relates to power limited digital circuitry. More specifically, the present invention relates to dynamic management of frequency or voltage of a processor to reduce power consumption by software applications.

BACKGROUND OF THE INVENTION

With the increasing use of portable battery-powered digital devices such as laptop computers, personal digital assistants and digital telephones, minimizing the power consumption of digital circuits becomes a more important issue. Several techniques are widely employed to reduce overall power consumption, including use of low power standby modes, dynamic circuit frequency reductions, and voltage reductions.

Determining the best combination of such techniques for reducing power, while not substantially interfering with user experience or software application reliability, is difficult. Various predictive scheduling techniques have been proposed that assign a frequency or predetermined supply voltage to each operation in a data flow graph of a software application so as to minimize the average energy consumption for given computation time or throughput constraints or both. Alternatively, self-timed circuits that lower the supply voltage until the microprocessor can just meet the specific performance requirement have been proposed. This approach scales supply voltage dynamically according to the quantity of processing data per unit time.

Unfortunately, predictive methods and self-timing circuits often provide suboptimal performance when applied to multimedia applications such as video or audio processing. To be useful, the prediction algorithms or timing circuitry must accurately predict future computational needs based on content data (such as contents of a MPEG frame). Even if the prediction is accurate, such an approach may require substantial extra processing (and therefore more energy) in order to generate the prediction.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Managing power usage for many applications is constrained by data delivery requirements. Simply reducing the performance (allowing a corresponding reduction in the processor operating voltage and consumed power) without feedback to determine when it is appropriate to later increase the performance is possible when data rate is not critical. However, for streaming multimedia or other real time applications it is not possible to arbitrarily reduce the processor speed. Power-efficient low processor speeds may cause the application to fail, unacceptably causing skipped frames or image degradation.

Figure 1:
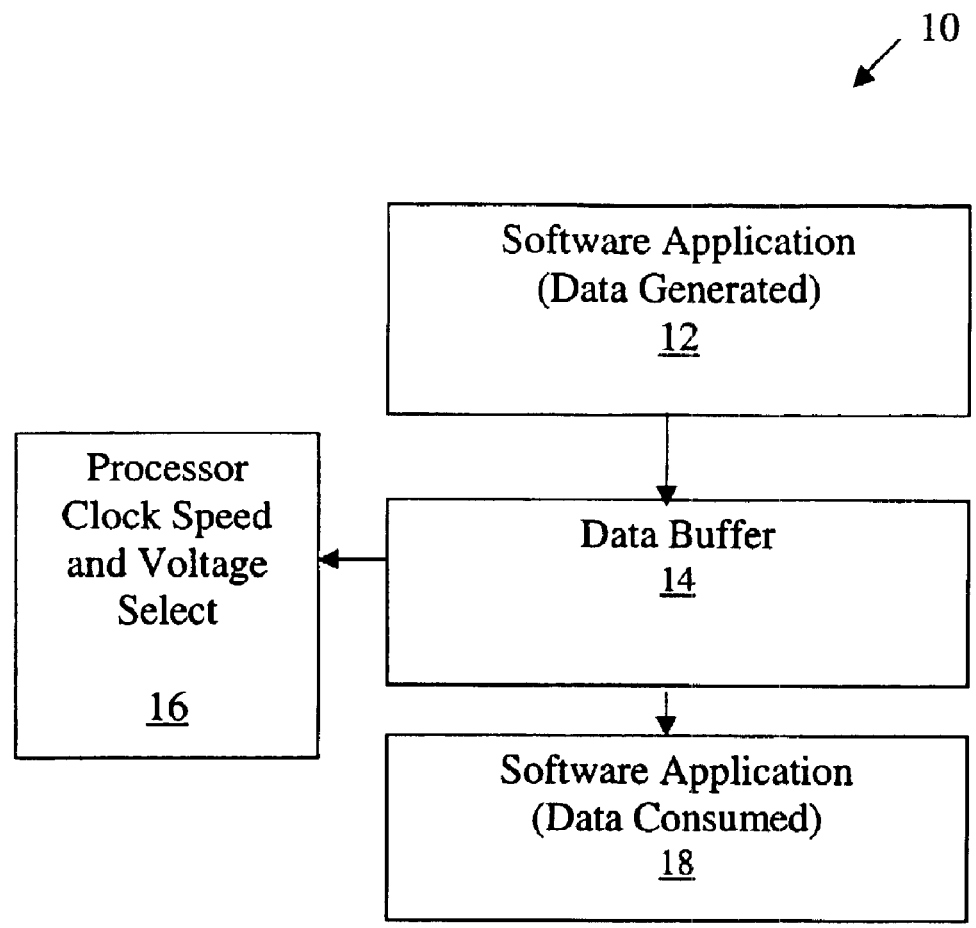
FIG. 1 generically illustrates a process for adjusting processor voltage or clock speed in response to data buffer utilization by a software application.

As seen with respect to FIG. 1, a system 10 for managing power of digital circuitry includes a power intensive software application module 12 that generates data, temporarily storing the generated data in a data buffer 14. The data buffer 14 feeds data to software application module 18. Software application modules 12 and 18 can be independent applications that pass data to each other through data buffer 14, or can be interacting components of a single software application that use the data buffer 14 for optimizing processing efficiency and throughput. In accordance with the present invention, data buffer 14 levels can be monitored by a processor clock speed or voltage select 16.

In operation, a module 12 acts as a data source, generating data at a variable rate for transfer to a data buffer 14. At a given processor frequency, this rate variation can be highly variable, and is mostly a function of the actual data being processed by the software application (which includes, but is not limited to modules 12 and 18), and the processor load from other applications. The module 18 acts as a sink, processing data at a fixed, or slowly varying rate. For the overall application to work properly, there should always be enough data in the buffer to sustain that rate. The rate can be modulated by changing the processor frequency. In effect, changes in the data buffer 14 level act to control the processor voltage and frequency, with the voltage and frequency increasing when the buffer level is small. Conversely, voltage and frequency are decreased when the buffer level is high. If the software application can directly control the processor voltage and frequency, the buffer level can be used to directly control the processor states. This may be done indirectly as well, by interfacing to a performance-control application that directly controls the processor. Otherwise, the value of the buffer level can be used as the information (directly or indirectly) passed to an operating system or hardware power management system.

This method can also be used for those applications for which the module 12 has to forward data to the data buffer 14 at predetermined constant rates (or a slowly varying rate bound by a known value). As before, variation of the data rate in the module 18 at a given level of processor performance is mostly a function of the actual data being processed by the application, and the processor load from other applications. To prevent buffer overflow, the level of the data buffer 14 indirectly controls the frequency and voltage of the processor by increasing voltage & frequency when the buffer level is high, and reducing voltage and frequency when the buffer level is low. As will be appreciated, certain applications may have constraints on both incoming and outgoing rates from the data buffer 14. A combination of the policies described above can then be used.

The foregoing method allows dynamic power management of a digital circuitry, including conventional processors, graphic processors, or processors optimized for network or portable applications. Typically, targeted applications are power intensive media or audiovisual encoding, decoding, or other data manipulation that consumes and/or generates substantial amounts of data that is storable in a buffered pipeline. The frequency/voltage of digital circuitry and transition times between various frequencies or voltages are controlled by monitoring the level of the appropriate data buffers, which either already exist to support the application or can be explicitly added.

Figure 2:
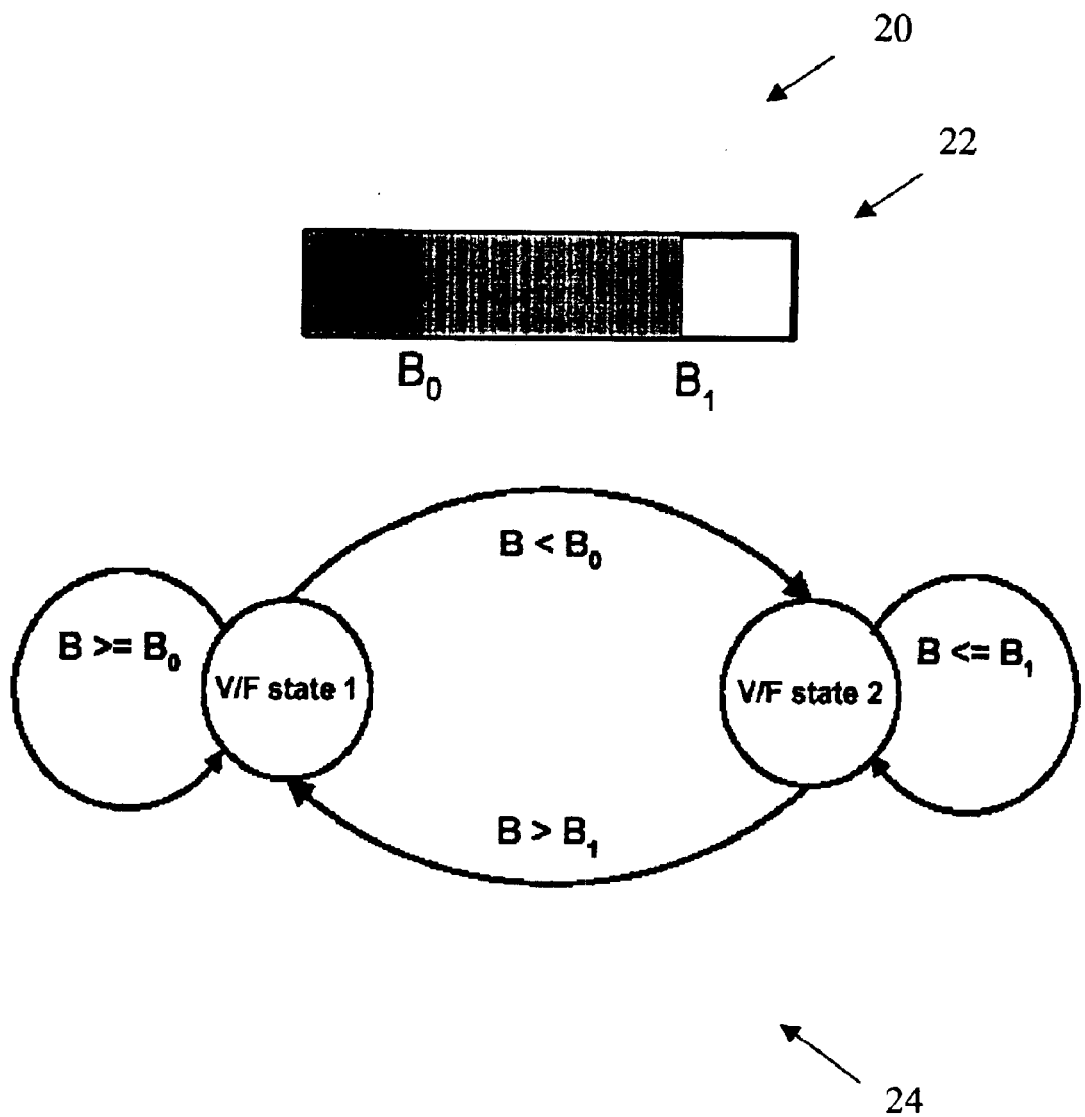
FIG. 2 illustrates a two state transition diagram for switching based on data buffer level.

As seen with respect to FIG. 2, a control scheme 20 illustrates switching back-and-forth between a high power state and a low power state in accordance with two state transition diagram 24. The state transition diagram 24 is intended for processor performance control while operating in buffer underflow conditions, with the data buffer being fed a highly variable data stream. The data buffer is defined to have a minimum lower level $B_0$ and higher level $B_1$ (schematically illustrated by buffer block 22). The time variable level B controls the frequency of a processor with two voltage/frequency states (state 1 is lower frequency than state 2). Assuming that the processor is initially in state 1, it is switched to state 2 if the buffer level becomes too small (smaller than $B_0$). It switches back to state 1 when the buffer level becomes larger than $B_1$.

Figure 3:
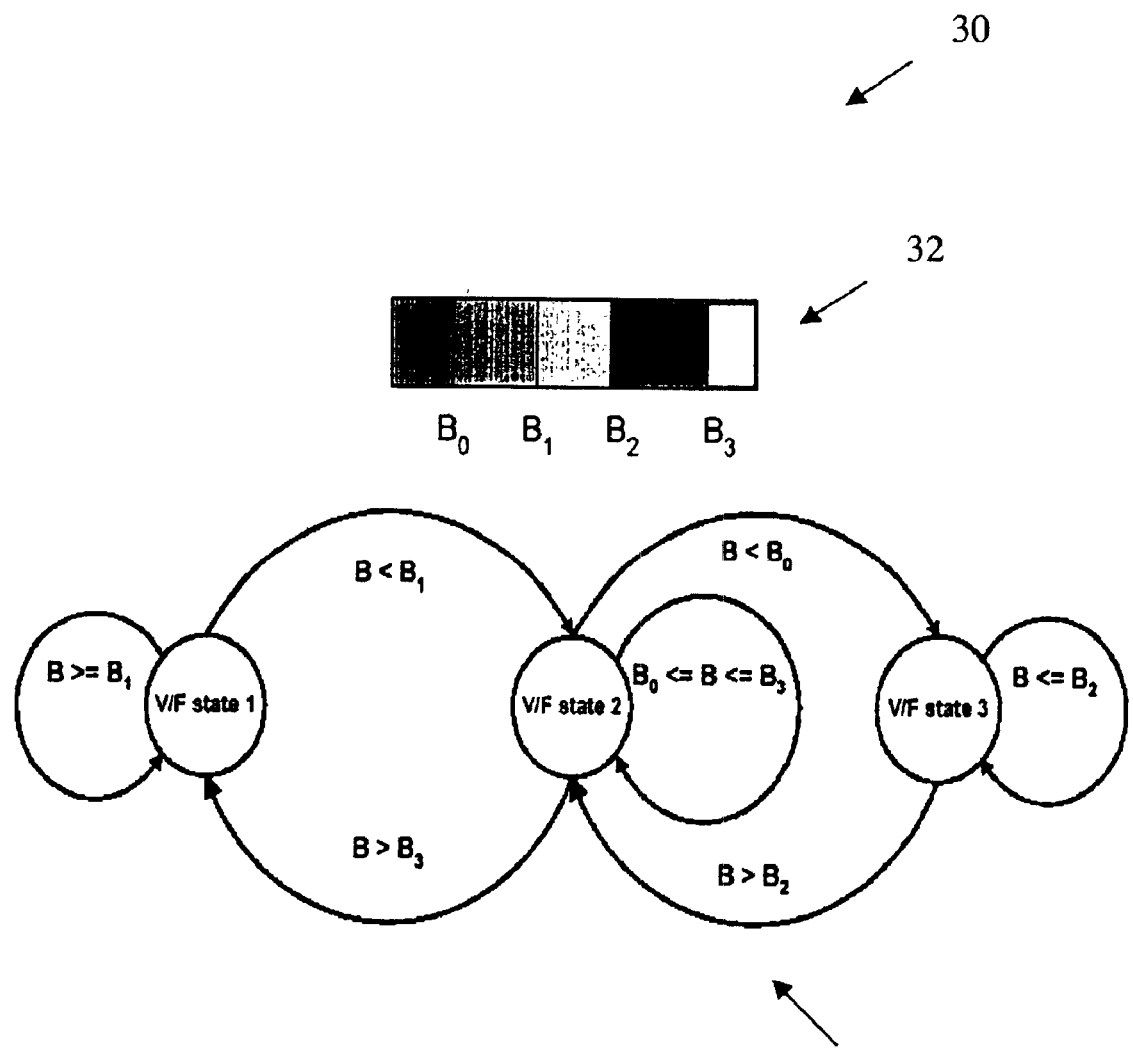
FIG. 3 illustrates a three state transition diagram for switching based on data buffer level.

FIG. 3 shows another realization of a control scheme 30 for a processor having three different frequency states, and a buffer level monitored using four level values (sequentially increasing variables $B_0$, $B_1$, $B_2$ and $B_3$ in data buffer block 32). The function controlling the state value is described again using a state transition diagram 34.

For clarity, the variables $B_0$, $B_1$, $B_2$ and $B_3$ in both FIGS. 2 and 3 are represented as being static. The overall buffer size of the buffer block 32 is similarly fixed. As will be appreciated, however, the buffer parameters can be modified as a function of other application parameters. For example, in a compressed video playback application, the variables could be changed as a function of the media content, bit rate, type of encoding (constant versus variable bit stream), sequence structure (number of I/P/B frames), etc. Adaption during the playback of a sequence as a function of compressed frame size (instantaneous bit rate), frame types, and read-access may similarly assist in power optimization. For example, before a load operation from the media storage (e.g., hard-drive, CD-ROM), it can be useful to guarantee a larger minimum number of frames in the buffer because of the increased system load. For applications with very low latency, the values of $B_0$, $B_1$, $B_2$ and $B_3$ could also be made time dependent.

In addition, the previous examples can be generalized for continuous frequencies providing 4 levels, 5 levels, n levels of processor operating frequency. The rate the buffer level is read is also subject to optimization, and is typically a function of many parameters, including the specific software application, the size and numbers of memory buffers, applications, or processors monitored and controlled, and the latency of voltage/frequency state changes.

Figure 4:
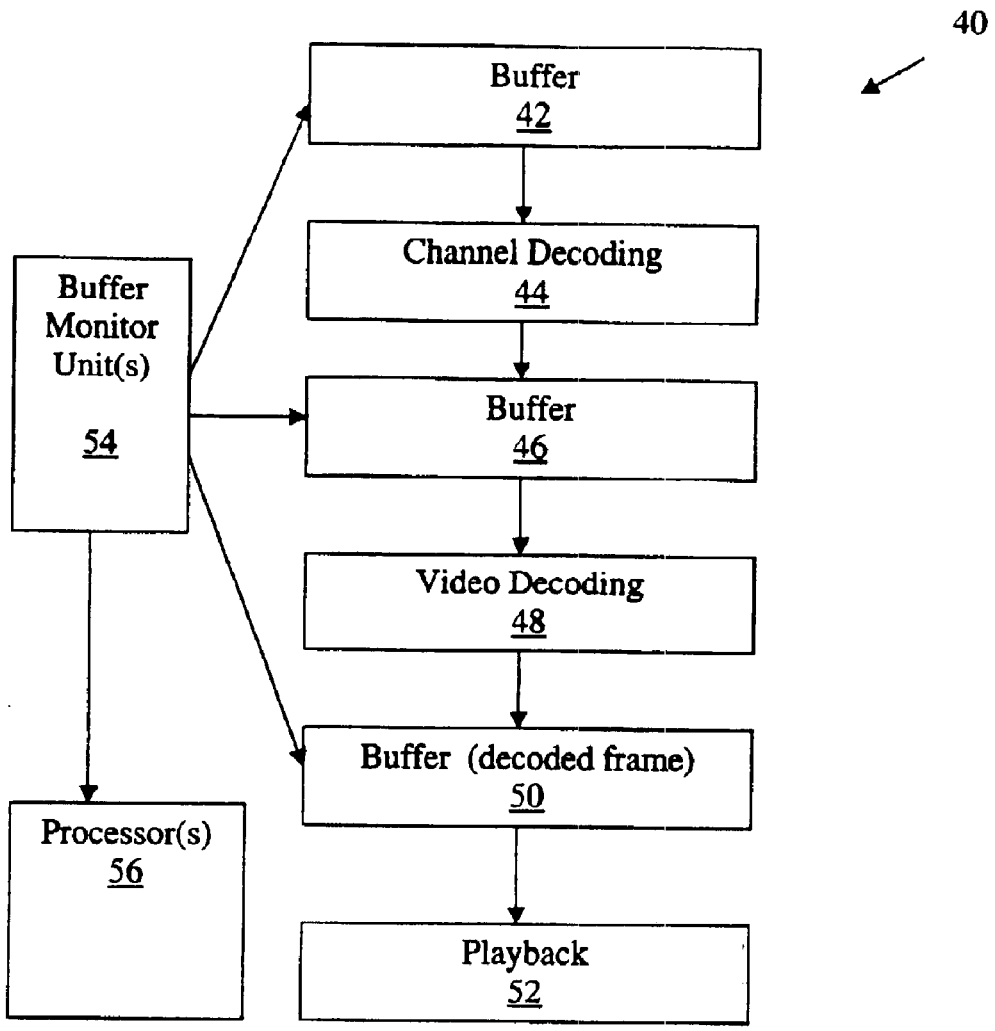
FIG. 4 illustrates switching based on input from multiple data buffers.

In certain embodiments, such as seen with respect to FIG. 4, multiple buffers can be monitored to more accurately control power consumption over one or more processors operating on a complex video stream processing system 40. As seen in FIG. 4, packets arrive at buffer 42, and are passed to a decoding channel 44. The data is accumulated in buffer 46 before being passed to a video decoding module 48. The decoded frames are held in buffer 50 before playback by module 52. Each step of this process can be associated with one or more threads on one or more processors, and the memory buffers 42, 46, and 50 are physically or logically independent memory units that can be separately monitored by buffer monitor unit(s) 54. Depending on the data flow and preferred usage model, the one or more processors 56 of the video data stream can be separately controlled to reduce overall system power consumption. Processor control can include direct hardware signaling, or indirect control by an operating system, network operating system, or application that can receive signals from the buffer monitor units 54.

Figure 5:
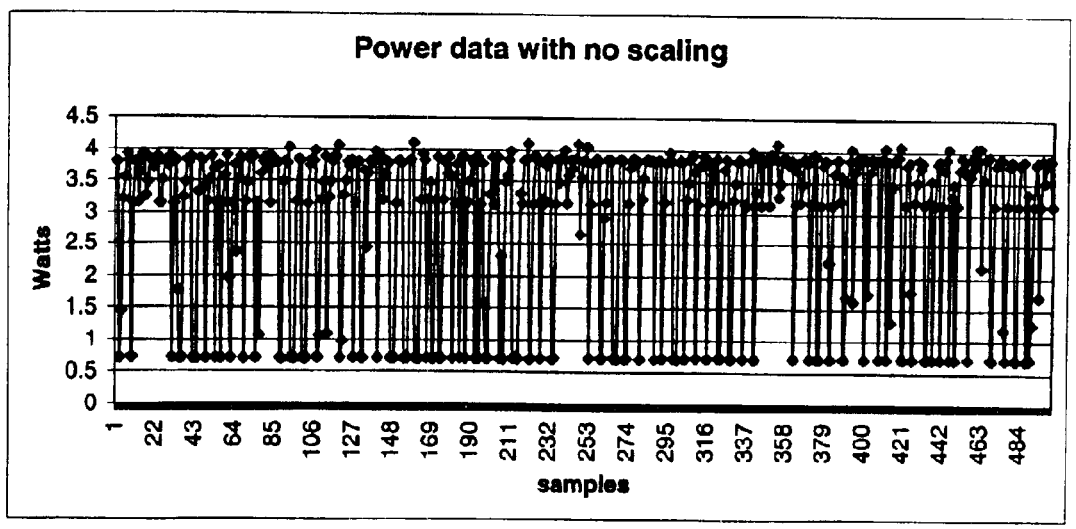
FIG. 5 illustrates power levels in a time series of audiovisual frame samples without data buffer monitoring.
Figure 6:
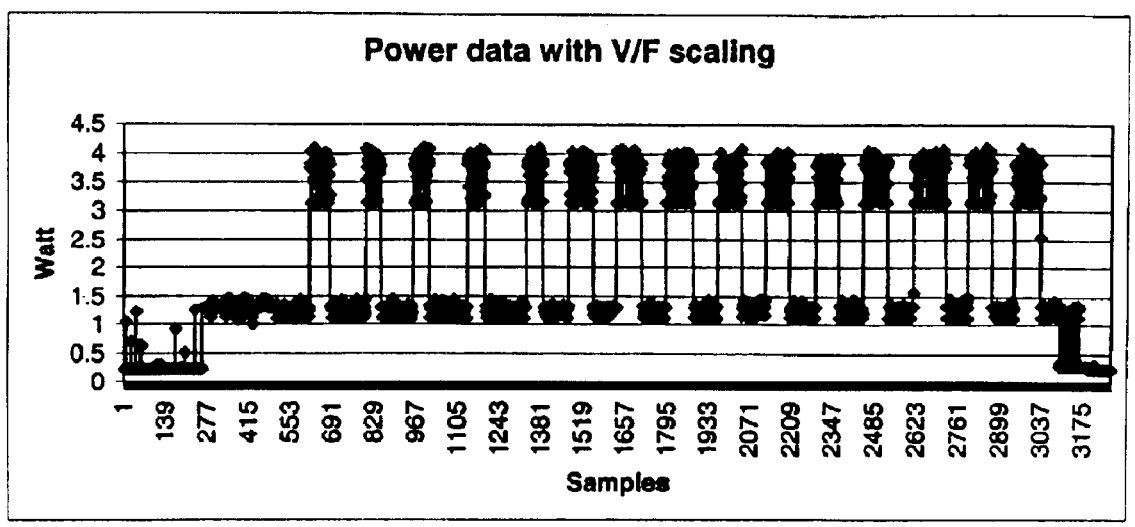
FIG. 6 illustrates reduced power levels in a time series of audiovisual frame sample with data buffer monitoring used to control processor frequency.

Compressed video playback is the application for which this buffer-based processor performance control was implemented and tested. As seen in FIG. 5, a graph 60 illustrates power output required for frames produced by a frame rendering module (corresponding to module 18 of FIG. 1). In this test run, the data buffer receives data from a highly variable video decoding module (corresponding to module 12 of FIG. 1). The decoding rate is a highly variable function of the bit rate, frame size, parameters used at encoding time, etc, and power required is generally high for the video sequence. When data-buffer monitoring is employed, the sustained power demand substantially drops, as shown by graph 70 of FIG. 6 for the same test sequence.

In operation, this automatic power reduction has minimal impact on received perceptual quality of image or audiovisual content, making it suitable for a wide variety of wired or wireless streaming multimedia, or other power sensitive software applications.

Software implementing the foregoing methods described above can be stored in the memory of a computer system (e.g., desktop computer, laptop computer, personal digital assistant, digital telephone, set top box, video recorders, etc.) as a set of instructions to be executed. In addition, the instructions to perform the method as described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above could be implemented in additional computer and/or machine readable media, such as discrete hardware components as large-scale integrated circuits (LSI's), application-specific integrated circuits (ASICD's), firmware such as electrically erasable programmable read-only memory (EEPROM's); and electrical, optical, acoustical and other forms of propagated signals (e.g., carrier waves, infrared signals, digital signals, etc.); etc. Furthermore, the software as described above could be implanted on the same hardware component, such as a graphics controller/media processor that may or may not be integrated into a chipset device.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic: "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method comprising:
    determining a first memory buffer level for at least one memory buffer providing data to digital circuitry,
    determining a second memory buffer level for a memory buffer, the second memory buffer level being set greater than the first memory buffer level,
    comparing data buffer levels in the at least one memory buffer with the first and second memory buffer levels, and
    sending the compared data buffer level to an operating system for the digital circuitry, wherein the operating system causes the digital circuitry to switch from a first state to a second state when the compared data buffer level is greater than the second memory buffer level, and wherein the operating system causes the digital circuitry to switch from a second state to a first state when the compared data buffer level is less than the first memory buffer level.

2. The method of claim 1, wherein the operating system causes the digital circuitry to switch between additional states in response to changing levels of memory buffer data in the at least one memory buffer.

3. The method of claim 1, wherein the first and second memory buffer levels are augmented by at least one additional memory buffer level to permit greater switching control by the operating system of the digital circuitry between states in response to compared data buffer levels.

4. The method of claim 1, wherein causing the operating system to switch the digital circuitry between the first state and the second state further comprises causing operating system to adjust clock frequency of the digital circuitry.

5. The method of claim 1, wherein causing operating system to switch the digital circuitry between the first state and the second state further comprises adjusting voltage of the digital circuitry.

6. The method of claim 1, wherein the digital circuitry comprises a processor, wherein the operating system of the processor directly controls the switch between states.

7. The method of claim 1, wherein the digital circuitry comprises a processor, wherein the operating system of the processor controls the switch between states in response to interactions with a power management controller.

8. An article comprising a computer-readable medium which stores computer-executable instructions, the instructions defined to cause a computer to:
    determine a first memory buffer level for at least one memory buffer providing data to digital circuitry,
    determine a second memory buffer level for a memory buffer, the second memory buffer level being set greater than the first memory buffer level,
    compare data buffer levels in the at least one memory buffer with the first and second memory buffer levels, and
    send the compared data buffer level to an operating system for the digital circuitry, wherein the operating system causes the digital circuitry to switch from a first state to a second state when the compared data buffer level is greater than the second memory buffer level, and wherein the operating system causes the digital circuitry to switch from a second state to a first state when the compared data buffer level is less than the first memory buffer level.

9. The article comprising a computer-readable medium which stores computer-executable instructions of claim 8, wherein the instructions further cause a computer to enable the operating system to switch the digital circuitry between additional states in response to changing levels of memory buffer data in at least one memory buffer.

10. The article comprising a computer-readable medium which stores computer-executable instructions of claim 8, wherein the instructions further cause a computer to provide augmentation of the first and second memory buffer levels by at least one additional memory buffer level to permit greater switching control by the operating system of the digital circuitry between states in response to compared data buffer levels.

11. The article comprising a computer-readable medium which stores computer-executable instructions of claim 8, wherein the instructions further cause a computer to enable the operating system to switch the digital circuitry between the first state and the second state by adjusting clock frequency of the digital circuitry.

12. The article comprising a computer-readable medium which stores computer-executable instructions of claim 8, wherein the instructions further cause a computer to enable the operating system to switch the digital circuitry between the first state and the second state by adjusting voltage of the digital circuitry.

13. The article comprising a computer-readable medium which stores computer-executable instructions of claim 8, wherein the digital circuitry comprises a processor, wherein the operating system of the processor controls the switch between states.

14. The article comprising a computer-readable medium which stores computer-executable instructions of claim 8, wherein the digital circuitry comprises a processor, wherein the operating system of the processor controls the switch between states in response to interactions with a power management controller.

15. A power reduction system comprising:
    a memory buffer monitoring unit to determine a first and a second memory buffer level for at least one memory buffer providing data to an operating system for digital circuitry, the second memory buffer level being set greater than the first memory buffer level, and
    a switching unit controlled by the operating system to adjust digital circuitry state, moving from a first state to a second state when compared data buffer level in the memory buffer monitoring unit is greater than the second memory buffer level, and moving from a second state to a first state when monitored data buffer level is less than the first memory buffer level.

16. The system of claim 15, further comprising enabling the operating system to switch the digital circuitry between additional states in response to changing levels of memory buffer data in at least one memory buffer.

17. The system of claim 15, wherein the first and second memory buffer levels in the memory buffer monitoring unit are augmented by at least one additional memory buffer level to permit greater switching control by the operating system of the digital circuitry between states in response to monitored data buffer levels.

18. The system of claim 15, wherein the switching unit controlled by the operating system can adjust the digital circuitry between the first state and the second state by the switching unit changing clock frequency of the digital circuitry.

19. The system of claim 15, wherein the switching unit controlled by the operating system can adjust between the first state and the second state by the switching unit changing voltage of the digital circuitry.

20. The system of claim 15, wherein the digital circuitry comprises a processor, wherein the operating system of the processor directly controls the switch between states.

21. The system of claim 15, wherein the digital circuitry comprises a processor, wherein the operating system of the processor controls the switch between states in response to interactions with a power management controller.

22. The system of claim 15, wherein the switching unit controlled by the operating system can adjust between the first state and the second state by the switching unit changing voltage and clock frequency of the digital circuitry.

23. The article comprising a computer-readable medium which stores computer-executable instructions of claim 8, wherein the instructions further cause a computer to enable the operating system to switch the digital circuitry between the first state and the second state by adjusting voltage and clock frequency of the digital circuitry.

24. The method of claim 1, wherein causing the operating system to switch the digital circuitry between the first state and the second state further comprises adjusting voltage and clock frequency of the digital circuitry.

* * * * *